(12) United States Patent
Kristani (10) Patent No.: US 9,567,900 B2
(45) Date of Patent: Feb. 14, 2017

(54) FOUR-CYCLE INTERNAL COMBUSTION ENGINE WITH CURTAILED INTAKE PROCESS

(71) Applicant: Filip Kristani, Maywood, NJ (US)

(72) Inventor: Filip Kristani, Maywood, NJ (US)

( * ) Notice: Subject to any disclaimer, the term of this patent is extended or adjusted under 35 U.S.C. 154(b) by 0 days.

(21) Appl. No.: 14/788,905

(22) Filed: Jul. 1, 2015

(65) Prior Publication Data

US 2016/0123220 A1     May 5, 2016

Related U.S. Application Data

(63) Continuation-in-part of application No. 14/530,704, filed on Nov. 1, 2014, now abandoned.

(51) Int. Cl.
    *F02B 75/02*     (2006.01)
    *F02D 33/02*     (2006.01)
    *F02D 13/02*     (2006.01)

(52) U.S. Cl.
    CPC ............ *F02B 75/02* (2013.01); *F02D 13/0269* (2013.01); *F02D 33/02* (2013.01); *F02B 2075/027* (2013.01)

(58) Field of Classification Search
    CPC ......... F01L 1/34; F02B 29/0493; F02B 75/02; F02D 13/0269; F02D 33/02
    See application file for complete search history.

(56) References Cited

U.S. PATENT DOCUMENTS

2012/0125276 A1 * 5/2012 Baldwin ............ F02D 13/0269
                                                           123/90.17

* cited by examiner

*Primary Examiner* — Jacob Amick
(74) *Attorney, Agent, or Firm* — Thomas J. Germinario (57) ABSTRACT

A four-cycle internal combustion engine has a permanent curtailed intake process, which allows the temperature and pressure of intake air to the combustion cylinders to be tightly controlled, and enables a very small combustion chamber so that a much higher compression ratio and pre-ignition compression pressure can be achieved without approaching the air/fuel mixture auto-ignition threshold. The maximum threshold of curtailed intake volume is determined to be 68% of engine cylinder volume to achieve a compression ratio CR of 22.1 or higher. Because this design can effectively regulate and set the maximum pre-ignition temperature of the fuel-air mixture, it can combust virtually any type of liquid hydrocarbon fuel without knocking. This four-cycle engine, due to its higher compression ratio, generates power equivalent to or greater than a standard four-cycle engine in a smaller and lighter engine and at a much higher efficiency.

3 Claims, 6 Drawing Sheets

FOUR-CYCLE INTERNAL COMBUSTION ENGINE WITH CURTAILED INTAKE PROCESS

REFERENCE TO RELATED APPLICATIONS

This application is a continuation-in-part of application Ser. No. 14/530,704, filed Nov. 1, 2014, the disclosure of which is incorporated herein by reference.

FIELD OF INVENTION

The present invention relates to the field of internal combustion engines, and more particularly to the field of four-cycle, Spark Ignition—Internal Combustion Engines.

BACKGROUND OF THE INVENTION

The efficiency of a naturally aspirated standard four-cycle gasoline (petrol) internal combustion engine is limited with respect to compression ratio and pre-ignition compression high pressure temperatures. This is because of the need to avoid pre-ignition temperatures close to the fuel's auto-ignition temperature threshold, beyond which the knocking effect will impair efficiency and reduce engine life. As a consequence of this pre-ignition temperature, standard four-cycle engines are typically limited to a low compression ratio (CR), a parameter that is defined as the ratio of the entire engine cylinder volume divided by the combustion chamber volume. For Standard Engines using standard gasoline fuel, CR is typically not greater than 11, which limits engines pre-ignition compression pressure of not more than 22 Bars.

Because of fuel auto-ignition temperatures, typically compression ratios chosen by engine manufacturers are between CR=9.5 and CR=11.8 for naturally aspirated engines. These values can vary but they are always less than CR=15.

These temperature and pressure constraints of the standard four-cycle engine design not only reduce engine efficiency, but they also result in larger and heavier engines and impose restrictions on the type of fuel that these engines can combust without knocking.

The present invention proposes a four-cycle internal combustion engine design with a permanent curtailed intake process, for which we will use short term "CIP" engine ("Curtailed Intake Process" engine), and consequently it has a curtailed compression process as well. As will be explained herein, this design allows the temperature and pressure of intake air to the combustion cylinders to be controlled, so that a much higher compression ratio CR and pre-ignition compression pressure can be achieved without approaching the auto-ignition threshold. Moreover, because this novel design can effectively regulate and set the maximum pre-ignition temperature of the fuel-air mixture, it can combust virtually any type of liquid hydrocarbon fuel without danger of knocking if the engine is designed for the lowest auto-ignition-temperature fuel to be used.

The four-cycle engine of the present invention, due to its much higher compression ratio, generates power equivalent to or greater than a standard four-cycle engine in a smaller and lighter engine and in an environment where all main engine parameters are under control for maximum output and efficiency.

SUMMARY OF THE INVENTION

The standard four-cycle naturally aspirated gasoline internal combustion engine has an intake cycle, a compression cycle, an expansion cycle, and an exhaust cycle. During the intake cycle, the piston moves downward and the air-fuel mixture is drawn into the cylinder. This is followed by the compression cycle, in which the piston moves upward and compresses the air-fuel mixture to its pre-ignition compression pressure. The compression cycle culminates in a spark ignition of the air/fuel mixture, which drives the piston downward in the expansion cycle. In the exhaust cycle, the piston moves upward again to drive the exhaust gas out of the cylinder in preparation for the next intake cycle. In general each of these processes is accomplished for an approximate half rotation of crankshaft or about 180 rotational degrees, plus/minus a variance depending on the engine cycle and load.

Power is generated in the four-cycle combustion process during the expansion cycle as the ignited air-fuel mixture expands within the cylinder, causing its pressure to drop. According to the Combined Gas Law, the quantity PV/T remains constant during this expansion (where P is gas pressure in Bars, V is gas volume in Liters, and T is gas temperature in $°K$). Consequently, for a given compression ratio, the pressure drop must be accompanied by a non-proportional decrease in absolute temperature. Since the decrease in absolute temperature determines the mechanical energy available for transmission to the crankshaft by the piston during the expansion cycle, the engine efficiency is optimized by maximizing the pressure drop during the expansion cycle. This, in turn, requires that the pre-ignition compression pressure be maximized by eliminating the negative effects of high temperatures.

In a standard naturally aspirated four-cycle internal combustion engine, intake air enters the combustion cylinder at ambient temperature and atmospheric pressure (approximately 1 Bar).

The present invention uses a shortened or a curtailed intake cycle process, which is much shorter than a half of crankshaft rotation or much less than 180°, in order to allow for more compression of the intake air in a higher compression ratio design engine cylinder. This process of shortened intake cycle of the present invention is applied in a completely different way, form and method from the concept of "Variable Valve Timing" (VVT) engine in use today or similar, and as such, it produces a totally different result.

A variable valve timing process in use today in naturally aspirated engines uses a certain mechanism attached to the camshaft to control the opening of the intake valves early or later than when the piston is at TDC, and/or to control closing the intake valves early or later than when the piston is at BDC, thus restricting the size of the intake volume, which can be smaller than the entire engine cylinder size at times. However, this process is applied as mentioned above at times, dynamically varying in accordance with engine operation mode to control torque and load mostly at different speeds. This means that while in operation, the variable valve timing process can reach at times the full intake volume engine size, a point which is achieved while the piston is at BDC or close to it.

Standard engines in use today that apply such a concept do not have a compression ratio CR higher than 15, or in some very extreme cases and only at very high RPM engines, can they reach a compression ratio close to CR=17.

If, for a moment the mechanism of variable valve timing process were to fail in an existing engine in use today (set and forget the volume size of intake to a certain value for example), this engine will not operate optimally depending at which point the intake volume size is stuck, and the engine trouble light will come on because the engine would be underperforming and operating at a loss this way since its compression ratio is still low and under <15, because that engine is designed and produced as such with a low compression ratio CR to begin with, and the benefits of high compression ratio combined with a reduced intake, which is essential in the present invention, are not realized at low CR's as described herein. This means that such an engine with a reduced intake process operating continuously, and at a low CR combination, operates at a diminished efficiency, and this is not what is being proposed in this application.

In some other engines of today that use the concept of variable or non-variable valve timing process that actually do conclude in a real reduction of the intake volume size by design to operate as such at all the times, as we are recommending to be used in a CIP engine, in some shape or form, as in Miller cycle for example, other methods and/or components are employed or recommended by Miller to make up for the air volume amount lost in the reduced intake, such as turbochargers and other devices that increase the volume air pressure and therefore the volume of air to make up for the loss, believing in some way that this loss of air resulting from reduced intake volume needs to be compensated, and thus the use of higher compression ratios is not even considered because these engines have even a lower compression ratio that is less than 8.5 (as in turbo-charged or supercharged engines).

In the present invention, however, the design of an engine that uses reduced intake volume of air at atmospheric pressure is contrary to the teachings of the prior art. The reduced or curtailed intake volume has to be applied in such a way that must result in a partial volume of the engine cylinder to be available on intake and filled less with air at all the times similar to Miller cycle but in different boundaries (Miller recommends 80% to 70% of the intake volume size be available for his cycle, a CIP starting point is lower than that as it is described herein below) and in a different engine and method. This means that the intake valves in this application can never be closed while the piston is at BDC or close to BDC, since that would represent an entire cylinder volume size of intake as it does in standard variable valve timing engine. Also, this application in a CIP engine is a such that does not allow for any other devices to be used, such as turbochargers or other pressure producing devices to make up for the air pressure difference contrary to what was recommended by Miller in turbo-charged or supercharged engines to make up for the difference in air loss volume.

The curtailed intake process recommended in the present invention as such, allows therefore a different type of benefit and different type of goal to be achieved, that is a higher efficiency engine. This is because besides the reduced intake that is applied on the present invention as a certain required procedure, this invention requires also a smaller combustion chamber volume comparably as well to achieve the proposed goal, therefore a higher compression as mentioned above or higher compression ratio CR and this requirement is unique only to a CIP engine. The smaller the intake volume size the smaller the combustion chamber size and therefore the higher the compression ratio, since the compression ratio CR is the ratio of the entire cylinder over the combustion chamber size. This engine can be designed thus to achieve compression ratios of 18 (CR=18 being the lowest, but not preferable) or above and therefore have a much higher efficiency.

The actual air/mixture pressure in a CIP engine that has been determined optimally designed, can reach as high as 37 Bars at the end of its compression cycle without the danger of the auto-ignition. This is because this novel design reduces the residual exhaust gas to a minimum due to a very high design compression ratio CR=29.4, and therefore a very small size combustion chamber, so their negative effect is eliminated since there is less remaining exhaust gase(s) at the end of the exhaust cycle.

On the other hand, since CIP engines have a combustion chamber that is very small compared to a standard engine combustion chamber, the compression and the temperature of air/mixture is increased dramatically near the end of the compression cycle or at the very top, close to TDC. This allows a certain CIP engine to facilitate the use of a spark or a non spark process to initiate a controlled or spontaneous combustion process of air/mixture, because of auto-ignition phenomenon as a result of increase in temperature beyond the auto-ignition of the compressed mixture is bound to happen very close to TDC where it is exactly therefore required.

There is a no limit to the reduced size of the intake volume to be realized in this invention, which therefore achieves the smallest size of the combustion chamber. The optimal compression ratio for these engines is calculated to be around CR=30, with the reduced intake volume set at 0.55 volume of the engine cylinder size. Exhaust gases for the above mentioned CIP engine will have a pressure of about 1 Bar at the end of the expansion cycle. These values can vary and will depend on the engine design.

The unsolved problem with today's engines is that, being heat engines as combustion engines are, the work in the engine is obtained through the process of heat, and the hot gases at the end of the expansion cycle, when the piston is at BDC, when exhaust valves are about to open and exhaust released, have still a high pressure (higher than the atmospheric pressure) and a high temperature which can be still useful if it can be further extracted from the engine instead of being discharged into the ambient.

In simple terms, the proposed engine solves the above problem, since the CIP engine has a higher efficiency because it uses a reduced volume of air on intake cycle and a smaller combustion chamber due to higher compression ratio CR, and therefore less fuel is needed to reach an equal temperature inside the combustion chamber as compared to a standard engine, which has a lower CR and a bigger combustion chamber instead. But the present invention will still use the entire cylinder volume during expansion cycle, and because of that the hot gases at the end of the expansion cycle will have a much lower pressure (very close to an atmospheric pressure or about 1 Bar in fact) and a lower residual temperature, therefore yielding a higher engine efficiency.

The maximum curtailed intake volume size to be used, for the increase in efficiency to be realized as compared with today's engines, is calculated to be about 68% of the entire engine cylinder volume and or less. This means that in the present invention the intake volume must be always less than or equal to 68% of the entire cylinder size. This occurs when the intake valves are closed when the piston is at 110° or earlier, and/or when the intake valves are opened when the piston is at 250° or after of crankshaft position. This engine has also the lowest compression ratio of about CR=22 (the combustion chamber is about 4.5% of the cylinder volume size in this case), which is the lowest efficiency for this type of CIP engine. The smaller the intake size volume the better while one reaches higher efficiencies and the optimal efficiency point of the engine design.

A CIP engine may operate with or without a throttling device.

Other means can be used to reduce the intake air volume amount in an engine cylinder such as air control valves, narrow passages etc. which can practically produce similar results as a curtailed intake process could in an engine and therefore allow for compression ratios higher than 18 as explained herein.

This engine is designed to operate with an atmospheric air pressure as it is described herein, however a turbocharged or supercharged version of a CIP engine can also be built, and which through a combination of certain curtailed intake size and higher compression ratios than 18 (CR>18) achieve similar results.

DETAILED DESCRIPTIONS OF THE PREFERRED EMBODIMENTS

Figure 1:
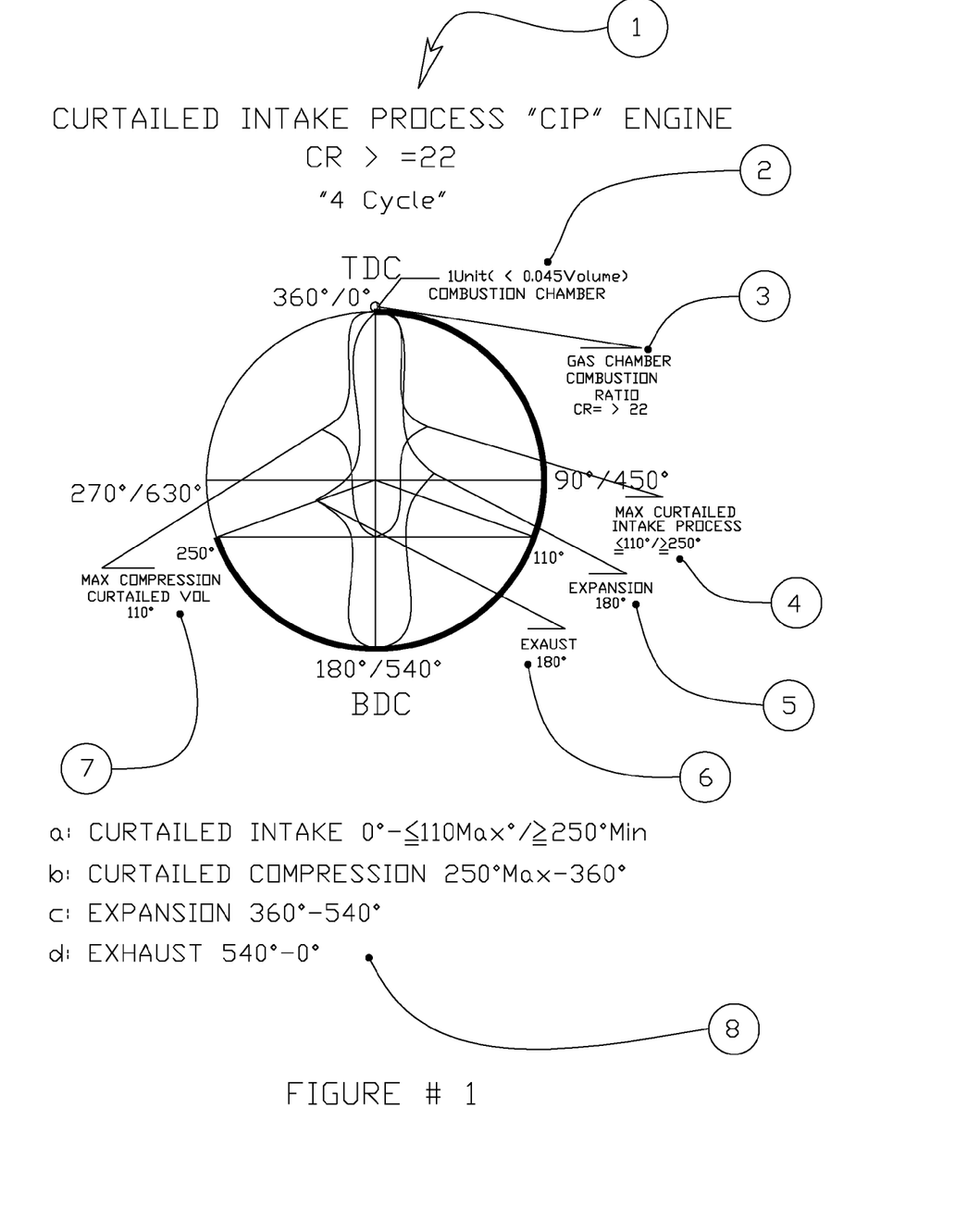
FIG. 1 is a schematic diagram illustrating the four-cycle combustion process of the present invention for a 4 cycle engine with suggested curtailed intake process.

Referring to FIG. 1, is a four-cycle, 1 Liter single-cylinder combustion process diagram 1 with curtailed intake process, comprising a short or curtailed intake process recommended maximum crankshaft angular range selection 4 (0°-<110°/>250°) for the curtailed intake process that will result in a curtailed compression process, a maximum recommended curtailed compression process 7 (250°-360°), hot gas expansion process 5 (360°-540°) and exhaust process 6 (540°-0°) of crankshaft angular position, with a compression ratio CR 3 of recommended range of 22:1 or higher and a recommended combustion chamber volume size 2 range volume smaller than 0.045 of engine cylinder volume.

Figure 2:
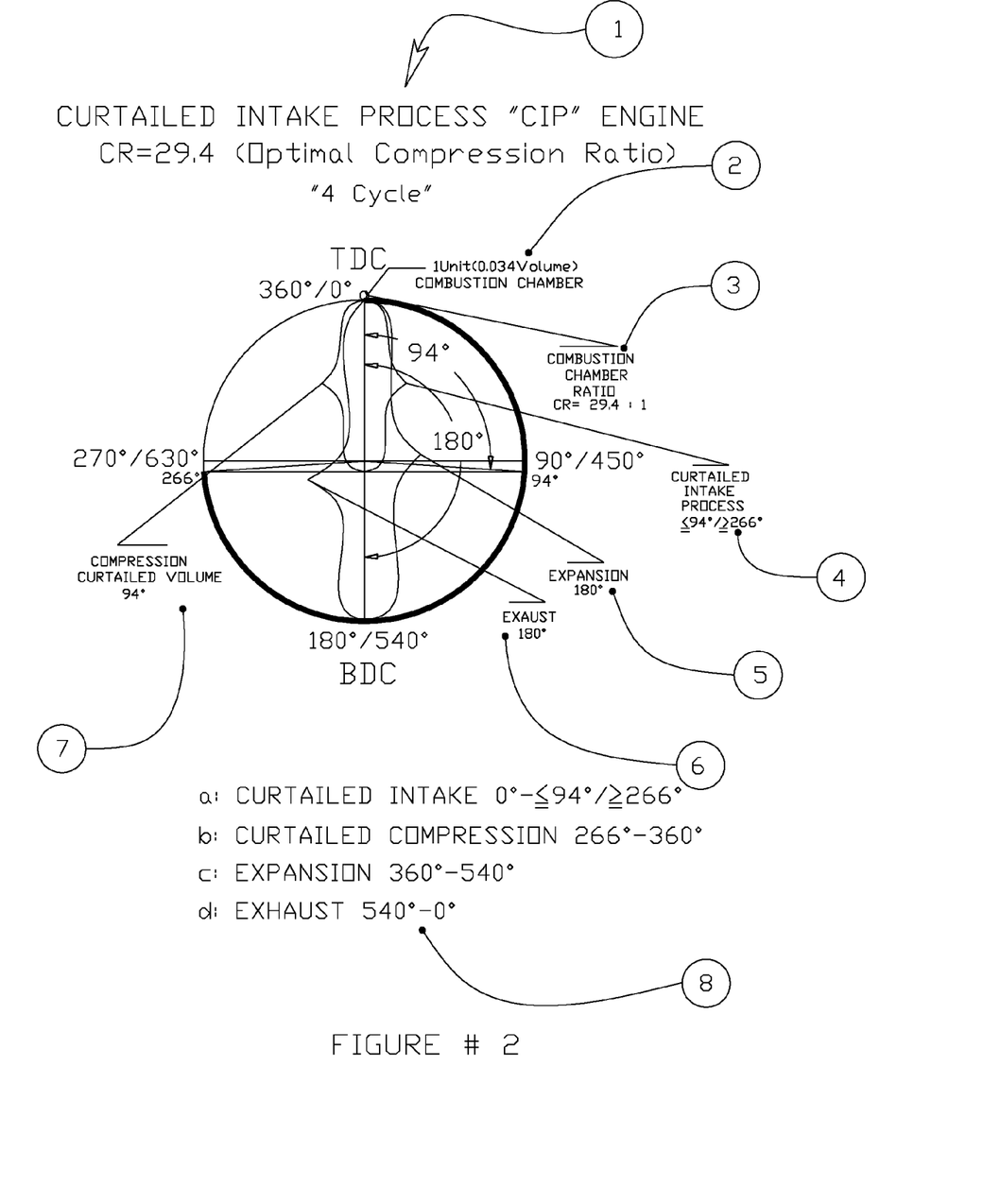
FIG. 2 is a schematic diagram illustrating a four-cycle combustion process of the present invention for a 4 cycle optimal "CIP" engine with 55% curtailed intake process and 29.4 compression ratio.

Referring to FIG. 2, is a diagram of an optimal recommended four-cycle, 1 Liter single-cylinder volume combustion process diagram 1 with curtailed intake process, comprising a short or curtailed intake process 4 (0°-<94°/>266°), a compression process 7 (266°-360°), hot gas expansion process 5 (360°-540°) and exhaust process 6 (540°-0°) of crankshaft position angle, with a compression ratio of 29.4:1 and combustion chamber volume size 2 of 0.034 engine cylinder volume size and a detailed script of each process angular rotation position 8.

Figure 3:
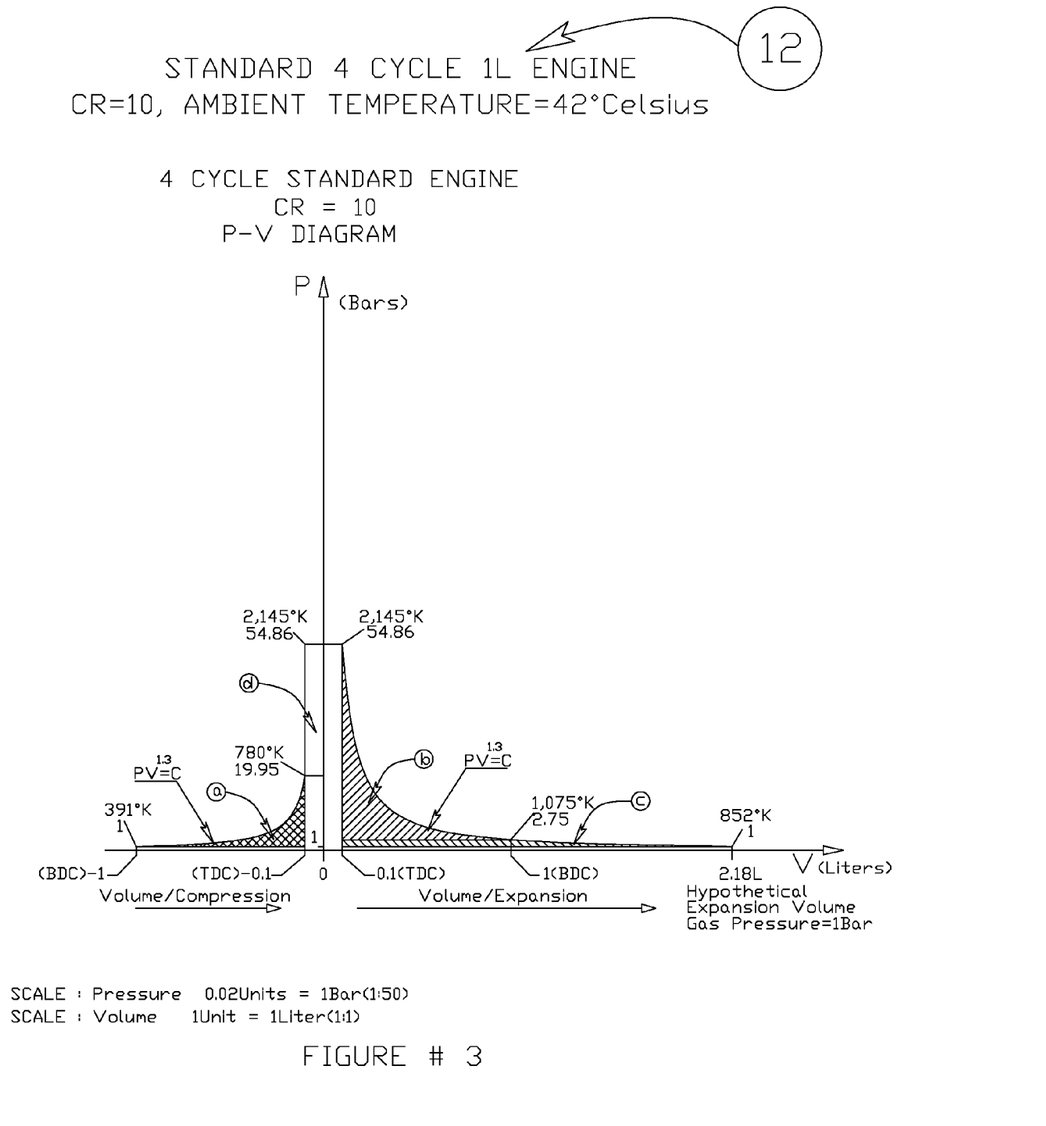
FIG. 3 is an exemplary P-V diagrams for a four-cycle standard naturally aspirated single-cylinder combustion process with a compression ratio CR=10 and volume engine cylinder size $V_e$=1 Liter.
Figure 3A:
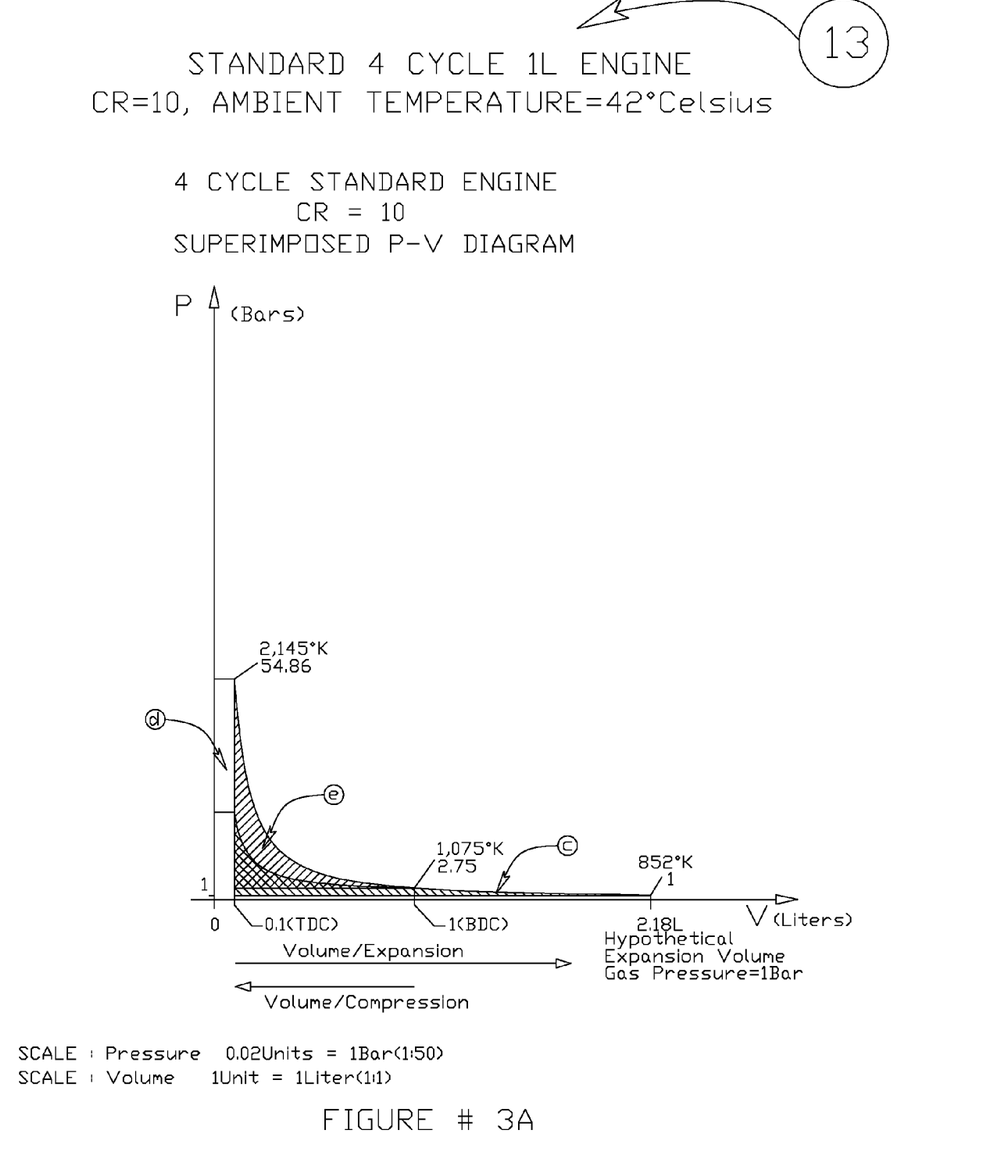
FIG. 3A is an exemplary superimposed P-V diagrams for a four-cycle standard naturally aspirated single-cylinder combustion process with a compression ratio CR=10 and volume engine cylinder size $V_e$=1 Liter.

FIGS. 3 and 3A represent the P-V diagrams 12 and superimposed P-V diagram 13 of a standard naturally aspirated SI, 1 Liter engine with CR=10, where:

a—work spent by the engine on compression=2.30PV/cycle, b—work gained by engine on expansion=6.86PV/cycle, c—work that cannot be captured on exhaust and it is lost=2.52PV/cycle, d—heat applied to the engine by burning fuel which increases the pressure by 2.75 times, e—work balance gained by engine=4.56PV/cycle.

Simplified efficiency of this engine is: E=4.56/7.08=64%

Figure 4:
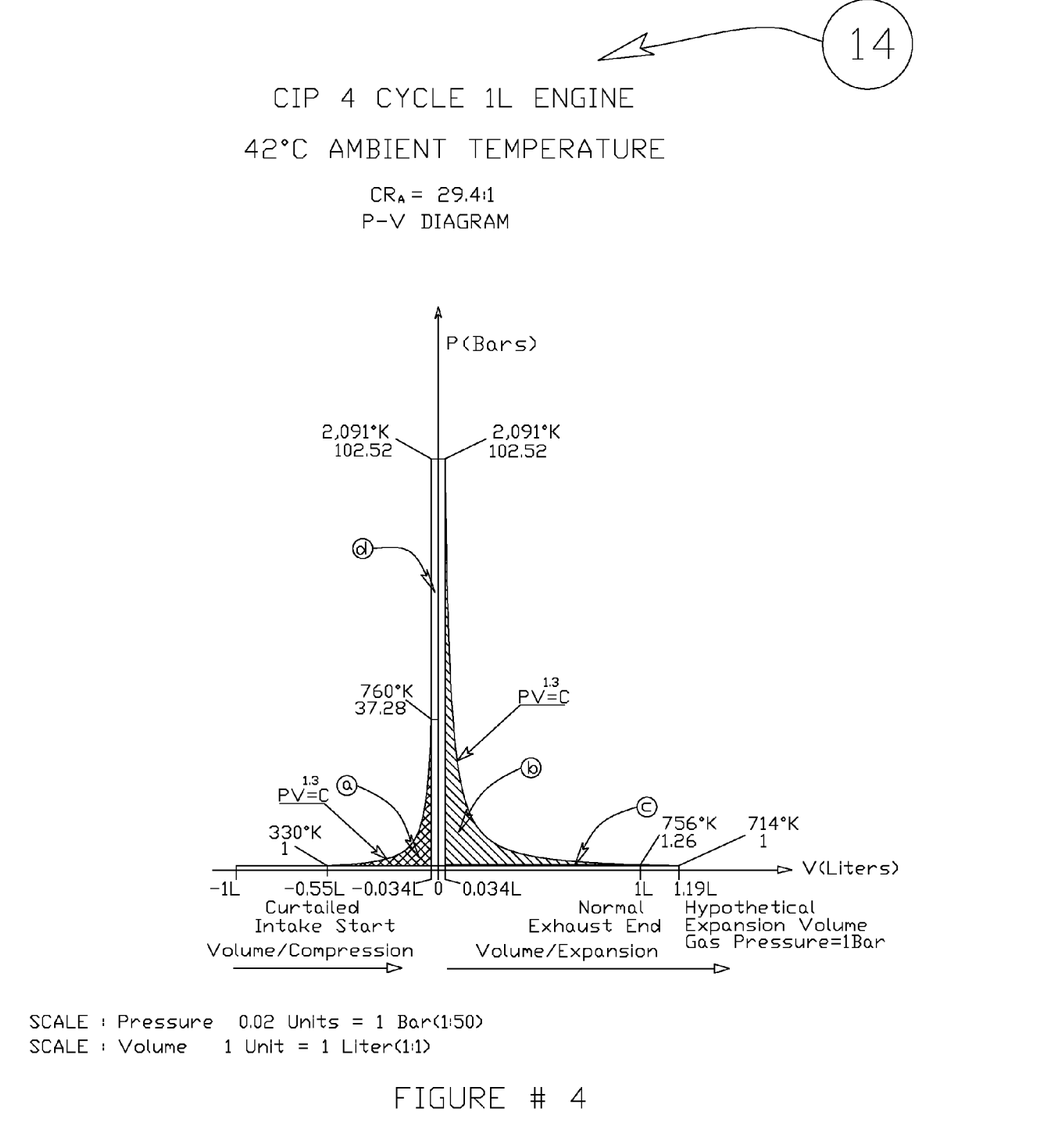
FIG. 4 is an exemplary P-V diagrams for a four-cycle "CIP" single-cylinder combustion process with a compression ratio CR=29.4, curtailed intake volume $V_t$=0.55 Liter and volume engine cylinder size $V_e$=1 Liter.
Figure 4A:
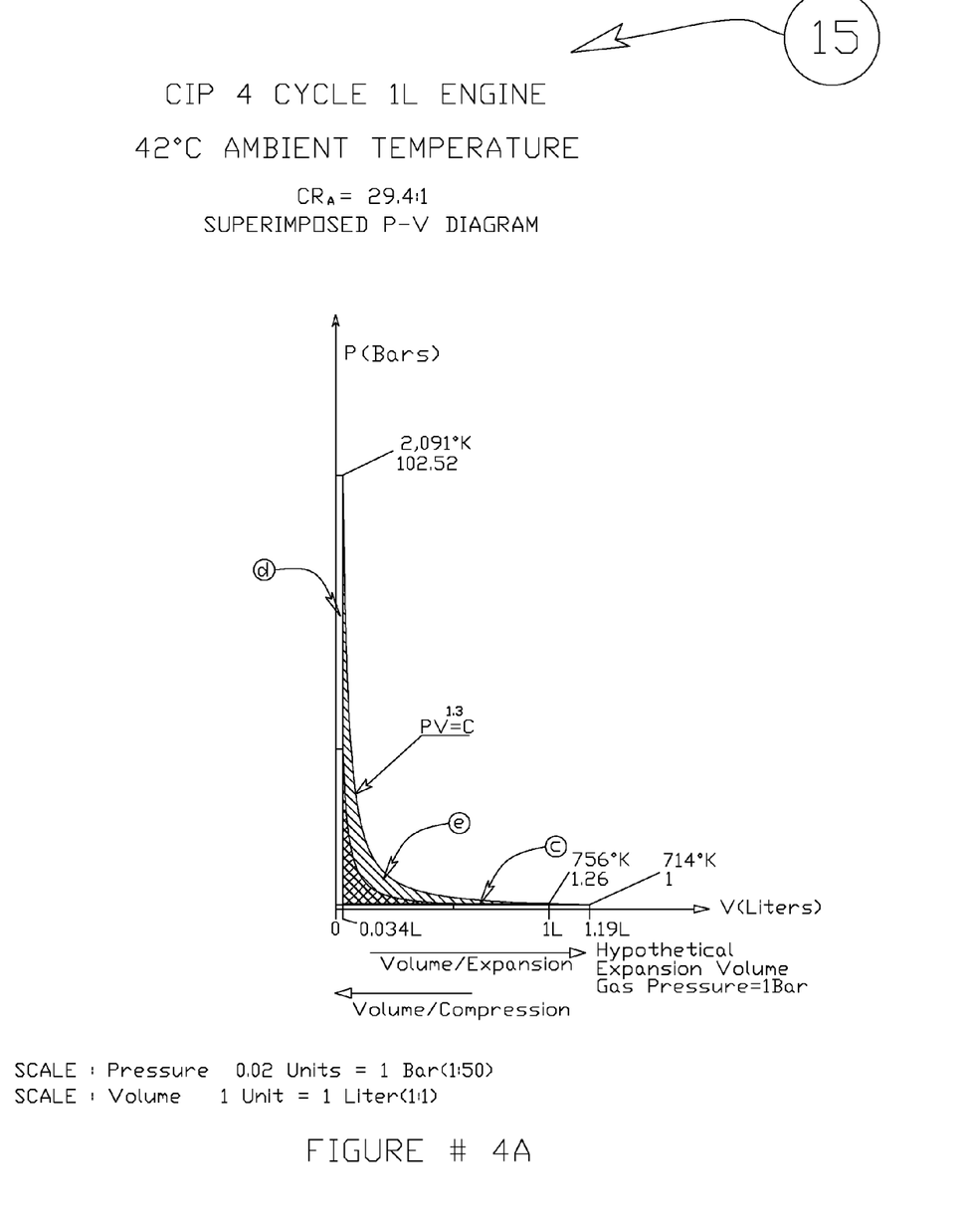
FIG. 4A is an exemplary superimposed P-V diagrams for a four-cycle "CIP" single-cylinder combustion process with a compression ratio CR=29.4, curtailed intake volume $V_t$=0.55 Liter and volume engine cylinder size $V_e$=1 Liter.

While, FIGS. 4 and 4A represent the P-V diagrams 14 and superimposed P-V diagram 15 of a "CIP" 1 Liter engine with CR=29.4, where:

a—work spent by the engine on compression=1.88PV/cycle, b—work gained by engine on expansion=6.135PV/cycle, c—work that cannot be captured on exhaust and it is lost=0.27PV/cycle, d—heat applied to the engine by burning fuel which increases the pressure by 2.75 times, e—work balance gained by engine=4.255PV/cycle.

Simplified efficiency of this engine is: E=4.255/4.525=94%

Efficiency Comparisons Between "Standard" and "CIP" Engines

Considering FIGS. 3 and 3A, are P-V diagrams for a four-cycle naturally aspirated standard single-cylinder combustion process 12 and 13 with a compression ratio CR=10 and volume engine cylinder size $V_e$=1 Liter. Hypothetical expansion engine volume of 2.18 Liters represents a non-existent expansion displayed for the purpose of evaluation. As it can be seen by this P-V diagram the temperature for a standard engine at the end of expansion cycle is about 1,075° K or 802° C. and a pressure of exhaust gases of about 2.75 bars.

Considering FIG. 4 and FIG. 4A, are P-V diagrams for a four-cycle optimal "CIP" engine combustion process 14 and 15 with a compression ratio CR=29.4 and volume engine cylinder size $V_e$=1 Liter. Being that this CIP engine has the process of intake end at 0.55 volume and the compression start at that point as well, from P-V diagram can be seen that work in compression for this engine is 1.88PV/cycle, which when compared is less than that of a standard engine which spends a work in compression equal to 2.30PV/cycle for a comparable work output (e), 4.56PV/cycle for a standard engine and 4.255PV/cycle for a CIP engine. The temperature of a CIP engine is 756° K or 483° C. and a pressure of 1.26 Bars of exhaust gases at the end of the expansion process which are both much less than that of a standard engine.

As illustrated by the foregoing P-V diagrams, the efficiency of the four-cycle "CIP" engine exceeds that of the standard SI-ICE engine.

Although the preferred embodiments of the present invention have been disclosed for illustrative purposes, those skilled in the art will appreciate that many additions, modifications and substitutions are possible, without departing from the scope and spirit of the present invention as defined by the accompanying claims.

As used hereinabove and in the following claims, the term Top Dead Center (TDC) means the piston's closest position to the cylinder head, corresponding to a crankshaft angle of 0° or 360°, and the term Bottom Dead Center (BDC) means the piston's farthest position from the cylinder head, corresponding to a crankshaft angle of 180°. Total cylinder volume means the volume of the cylinder when the piston is at BDC, and the combustion chamber volume means the volume of the cylinder when piston is at TDC.

What is claimed is:

1. A four-cycle spark ignition "Curtailed Intake Process" internal combustion engine comprising:
one or more combustion cylinders, each cylinder having a total cylinder volume, a top dead center (TDC) and a bottom dead center (BDC), and each cylinder having one or more intake valves, and each cylinder containing an axially reciprocating piston mechanically connected to a crankshaft and a flywheel, wherein each cylinder is configured to execute a four-cycle combustion process, comprising a permanent curtailed intake cycle that requires a minimized combustion chamber volume corresponding to an engine compression ratio (CR) of 22.1 or higher, during which curtailed intake cycle one or more of the intake valves remain open and the piston moves axially from the TDC of the cylinder through a crankshaft intake angle interval and draws a curtailed intake volume of an air-fuel mixture through the intake valves into the cylinder, followed by a compression cycle, during which all intake valves are closed and the piston moves axially toward the TDC of the cylinder and compresses the air-fuel mixture to a pre-ignition compression volume, which is equal to the combustion chamber volume, a pre-ignition compression pressure, and a pre-ignition compression temperature, followed by a spark ignition of the air-fuel mixture, which drives the piston toward the BDC of the cylinder in an expansion cycle, followed by an exhaust cycle, during which the piston moves toward the TDC of the cylinder and drives an exhaust gas out of the cylinder ahead of a next intake cycle, and wherein the total cylinder volume of each combustion cylinder is a volume of the cylinder with the piston at BDC, and wherein the combustion chamber volume of each combustion cylinder is a volume of the cylinder with the piston at TDC, and wherein a ratio of the total cylinder volume to the combustion chamber volume defines the compression ratio CR, and wherein the CR is at least 22.1, and wherein the CR of 22.1 results in a relatively lower engine efficiency, while the CR greater than 22.1 results in a relatively higher engine efficiency;
wherein the crankshaft intake angle size is configured to minimize the size of the combustion chamber and thereby maximize the pre-ignition compression pressure and the compression ratio CR while maintaining the pre-ignition compression temperature at a level below an auto-ignition temperature of a selected fuel, and:
wherein a combination of the compression ratio CR of at least 22.1 and a curtailed intake cycle maximizes the engine efficiency.

2. The engine of claim 1, wherein the crankshaft intake angle interval is at a value at which a ratio of the curtailed intake volume to the total cylinder volume is equal or less than 0.68.

3. The engine of claim 2, wherein the intake valves are configured either to open at a crankshaft angle at or near 0° and close at a crankshaft angle of 110° or less, or to close at a crankshaft angle of 250° or greater.

* * * * *